US012688582B2

(12) United States Patent
Reiss et al.

(10) Patent No.: US 12,688,582 B2
(45) Date of Patent: Jul. 21, 2026

(54) SERIES SELECTION FOR COMPUTER VISION MACHINE LEARNING MODELS ANALYZING MEDICAL IMAGES

(71) Applicant: Aidoc Medical Ltd, Tel Aviv (IL)

(72) Inventors: Ido Reiss, Omer (IL); Ronny Sharon Levanda, Ramat-Gan (IL); Uri Goren Horesh, Modiln (IL); Idan Bassukevitz, Givatayim (IL)

(73) Assignee: Aidoc Medical Ltd, Tel Aviv (IL)

( * ) Notice: Subject to any disclaimer, the term of this patent is extended or adjusted under 35 U.S.C. 154(b) by 259 days.

(21) Appl. No.: 18/515,368

(22) Filed: Nov. 21, 2023

(65) Prior Publication Data

US 2024/0177308 A1 May 30, 2024

Related U.S. Application Data

(63) Continuation-in-part of application No. 18/374,103, filed on Sep. 28, 2023, now Pat. No. 12,518,517.

(Continued)

(51) Int. Cl.
*G06K 9/00* (2022.01)
*G06T 7/00* (2017.01)
*G06V 10/776* (2022.01)

(52) U.S. Cl.
CPC .......... *G06T 7/0012* (2013.01); *G06V 10/776* (2022.01); *G06T 2207/20084* (2013.01); *G06T 2207/30004* (2013.01); *G06V 2201/03* (2022.01)

(58) Field of Classification Search
CPC ......... G06T 7/0012; G06T 2207/20084; G06T 2207/30004; G06V 10/776; G06V 2201/03
See application file for complete search history.

(56) References Cited

U.S. PATENT DOCUMENTS 11,907,810 B2    2/2024   Gadelrab et al.
11,928,583 B2    3/2024   Turgeman et al.
                 (Continued)

FOREIGN PATENT DOCUMENTS

AU    2020253890 A1 * 10/2021   ............. G16H 80/00
CA        3213801 A1 * 10/2022   ........... G06T 7/0012
                 (Continued)

OTHER PUBLICATIONS

Notice of Allowance Dated Oct. 27, 2025 from the US Patent and Trademark Office Re. U.S. Appl. No. 18/374,103. (11 pages).

(Continued)

*Primary Examiner* — Xin Jia

(57) ABSTRACT

There is provided a computer implemented method of scheduling analysis of at least one series of a study of medical images of a subject, comprising: predicting a time when at least one series of the study which is not yet available for processing, will be available for processing, predicting at least one parameter of the at least one series which is not yet available for processing, and obtaining the at least one parameter for series which are available, selecting a target series according to a combination of the predicted time and the at least one parameter, in response to the target series not yet available for processing, waiting for the target series to become available for processing, and in response to the target series being available for processing, feeding the target series into an image analysis machine learning model.

23 Claims, 7 Drawing Sheets

Related U.S. Application Data

(60) Provisional application No. 63/427,948, filed on Nov. 25, 2022.

(56) References Cited

U.S. PATENT DOCUMENTS

| | | | |
|---|---|---|---|
| 2024/0412491 A1 | 12/2024 | Sah et al. | |
| 2024/0428567 A1 | 12/2024 | Annangi et al. | |

FOREIGN PATENT DOCUMENTS

| | | | | | |
|---|---|---|---|---|---|
| CN | 102027449 A | * | 4/2011 | .......... | G06T 7/0012 |
| CN | 115115575 A | * | 9/2022 | .......... | G06T 7/0012 |
| WO | WO-2022129628 A1 | * | 6/2022 | .............. | G06T 7/11 |

OTHER PUBLICATIONS

Bustos et al. "PadChest: A Large Chest X-Ray Image Dataset With Multi-Label Annotated Reports", Medical Image Analysis, 66: 101797-1-101797-28, Published Online Apr. 20, 2020.

Casey et al. "A Systematic Review of Natural Language Processing Applied to Radiology Reports", BMC Medical Informatics and Decision Making, 21(1): 179-1-179-18, Jun. 3, 2021.

Chen et al. "Xgboost: EXtreme Gradient Boosting", R Package, Version 0.71.1, 1(4): 1-4, May 15, 2018.

Irvin et al. "CheXpert: A Large Chest Radiograph Dataset With Uncertainty Labels and Expert Comparison", AAAI'19/IAAI'19/EAAI'19: Proceedings of the Thirty-Third AAAI Conference on Artificial Intelligence and Thirty-First Innovative Applications of Artificial Intelligence Conference and Ninth AAAI Symposium on Educational Advances in Artificial Intelligence, 73: 590-597, Jan. 27, 2019.

Prokhorenkova et al. "CatBoost: Unbiased Boosting With Categorical Features", Advances in Neural Information Processing Systems, Proceedings of the 32nd International Conference on Neural Information Processing Systems, NIPS '18, Montreal, Canada, 31: 6639-6649, Dec. 3, 2018.

Thian et al. "Deep Learning Systems for Pneumothorax Detection on Chest Radiographs: A Multicenter External Validation Study", Radiology: Artificial Intelligence, 3(4): e200190-1-e200190-10, Apr. 14, 2021.

* cited by examiner

SERIES SELECTION FOR COMPUTER VISION MACHINE LEARNING MODELS ANALYZING MEDICAL IMAGES

RELATED APPLICATIONS

This application is a Continuation-in-Part (CIP) of U.S. patent application Ser. No. 18/374,103 filed on Sep. 28, 2023, which claims the benefit of priority of U.S. Provisional Patent Application No. 63/427,948 filed on Nov. 25, 2022.

This application also claims the benefit of priority of U.S. Provisional Patent Application No. 63/427,948 filed on Nov. 25, 2022.

The contents of the above applications are all incorporated by reference as if fully set forth herein in their entirety.

BACKGROUND

The present invention, in some embodiments thereof, relates to analysis of medical images and, more specifically, but not exclusively, to analyzing medical images by computer vision machine learning models.

Computer vision machine learning models are being increasingly used to analyzing medical images, for example, to detect clinical findings on CT scans, which may have hundreds of slices.

SUMMARY

According to a first aspect, a computer implemented method of scheduling analysis of at least one series of a study of medical images of a subject, comprises: predicting a time when at least one series of the study which is not yet available for processing, will be available for processing, predicting at least one parameter of the at least one series which is not yet available for processing, and obtaining the at least one parameter for series which are available, selecting a target series according to a combination of the predicted time and the at least one parameter, in response to the target series not yet available for processing, waiting for the target series to become available for processing, and in response to the target series being available for processing, feeding the target series into an image analysis machine learning model.

According to a second aspect, a system for scheduling analysis of at least one series of a study of medical images of a subject, comprises: at least one processor executing a code for: predicting a time when at least one series of the study which is not yet available for processing, will be available for processing, predicting at least one parameter of the at least one series which is not yet available for processing, and obtaining the at least one parameter for series which are available, selecting a target series according to a combination of the predicted time and the at least one parameter, in response to the target series not yet available for processing, waiting for the target series to become available for processing, and in response to the target series being available for processing, feeding the target series into an image analysis machine learning model.

According to a third aspect, a computer implemented method of scheduling analysis of at least one series of a study of medical images of a subject, comprises: in response to an end-of-study (EOS) of a plurality of series, for each respective series of the study, obtaining at least one parameter of metadata and/or properties of medical images of the respective series, and predicting a performance of an image analysis machine learning model being fed the respective series, selecting a target series from the plurality of series of the study according to a combination of the at least one parameter and the predicted performance computed for each respective series, and feeding the target series into the image analysis machine learning model.

In a further implementation form of the first, and second aspects, the study includes at least one series which is not yet available for processing and at least one series which is available for processing.

In a further implementation form of the first, and second aspects, further comprising: predicting resource utilization of a computer implementing inference by the image analysis machine learning model for each series of the study, wherein the combination for selecting the target series further includes the predicted resource utilization.

In a further implementation form of the first, and second aspects, further comprising: predicting a performance of the image analysis machine learning model for each series of the study including not yet available series and available series, wherein the combination for selecting the target series further includes the predicted performance.

In a further implementation form of the first, second, and third aspects, the at least one parameter includes metadata.

In a further implementation form of the first, second, and third aspects, the at least one parameter is selected from a group comprising: reconstruction plane, convolutional kernels, slice thickness, contrast phase, protocol name, reason for study, reason for the series, description of study, description of the series, contrast phase, anatomy depicted in the study, and reconstruction parameters.

In a further implementation form of the first, second, and third aspects, the selecting and the feeding are performed for each of a plurality of image analysis machine learning models according to a specific image analysis machine learning model of the plurality of image analysis machine learning models, wherein the target series is fed into the specific image analysis machine learning model.

In a further implementation form of the first, second, and third aspects, further comprising computing at least one respective weight for the predicted time for a respective series and/or for the at least one parameter of the respective series, wherein the combination for the respective series is computed according to the at least one respective weight.

In a further implementation form of the first, second, and third aspects, the at least one weight for the subsequent series is dynamically adapted according to outcome of the image analysis machine learning model analyzing at least one preceding series.

In a further implementation form of the first, second, and third aspects, further comprising computing a score for each series of the study as a function of the combination of the predicted time and the at least one parameter, and wherein selecting comprises selecting the target series according to the score.

In a further implementation form of the first, second, and third aspects, further comprising: in response to a score of a certain series being higher than a score of a current series being processed by the image analysis machine learning model, interrupt processing of the current series by the image analysis machine learning model, and instructing processing of the certain series by the image analysis machine learning model.

In a further implementation form of the first, and second aspects, further comprising: in response to a score of a predicted series which is not yet available for processing being higher than a score of a current series which is available for processing, not feeding the current series into the image analysis machine learning model and waiting for the predicted series to be available for processing.

In a further implementation form of the first, second, and third aspects, further comprising: for each series, computing a respective sub-score of a plurality of sub-scores for each of the predicted time, resource utilization of a computer implementing inference by the image analysis machine learning model, and performance of the image analysis machine learning model, and computing the score as an aggregation of the plurality of sub-scores.

In a further implementation form of the first, and second aspects, further comprising re-computing the score of the predicted series in response to at least one of: the predicted series being available, or after a predefined amount of time has elapsed.

In a further implementation form of the first, second, and third aspects, further comprising in response to a certain series which was previously unavailable for processing becoming available for processing, analyzing the certain series to determine actual value of at least one parameter, and correcting the predicted at least one parameter to the actual value.

In a further implementation form of the first, and second aspects, the estimated at least one parameter of the at least one series which is not yet available for processing and/or a prediction of the time when at least one series of the study which is not yet available for processing will be available for processing, is obtained as an outcome of a prediction ML model that is fed at least one parameter of the study, and at least one parameter and time when each at least one series became available for processing.

In a further implementation form of the first, second, and third aspects, the prediction ML model comprises: (i) a series encoder that receives the at least one parameter of the study as input, and generates an outcome of an encoded vector representing the series, (ii) a time stamped encoder that receives the encoded vector as input and the time when each at least one series became available for processing, and generates an encoded study, (iii) a decoder that receives the encoded study as input, and generates an outcome of a prediction of a time when at least one series will become available for processing and/or a prediction of parameter(s) of the at least one series which is not yet available for processing, until an end of the study.

In a further implementation form of the first, second, and third aspects, the prediction ML model is training on a training dataset of a plurality of records, wherein a record includes at least one parameter of a sample study, at least one parameter of a sample series of the sample study, and a time when the sample series became available for processing.

In a further implementation form of the first, second, and third aspects, further comprising: in response to a certain series which was not yet available for processing, being available for processing, repeating the predicting, the predicting at least one parameter, the obtaining at least one parameter, the selecting, and the feeding.

In a further implementation form of the first, second, and third aspects, selecting comprises feeding the combination into a decision machine learning model, and obtaining the target series as an outcome of the decision machine learning model, wherein the machine learning model is trained on a training dataset of a plurality of records, wherein a record is for a sample study, and includes time when a certain sample series became available for processing, at least one parameter of the certain sample series, and a ground truth indication of the target sample series.

In a further implementation form of the first, second, and third aspects, further comprising: performing a relevancy check on each series of the study, wherein the relevancy check is performed using the predicted at least one parameter for the series which is not yet available for processing, and using the obtained at least one parameter for the series which is available and/or by analyzing the series which is available, and excluding a certain series from the selecting and the feeding according to the relevancy check.

In a further implementation form of the first, and second aspects, further comprising predicting an end-of-study (EOS), wherein the target series is selected in view of the predicted EOS.

In a further implementation form of the third aspects, further comprising predicting resource utilization of a computer implementing inference by the image analysis machine learning model for each respective series, wherein the combination for selecting the target series further includes the predicted resource utilization of the respective series.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
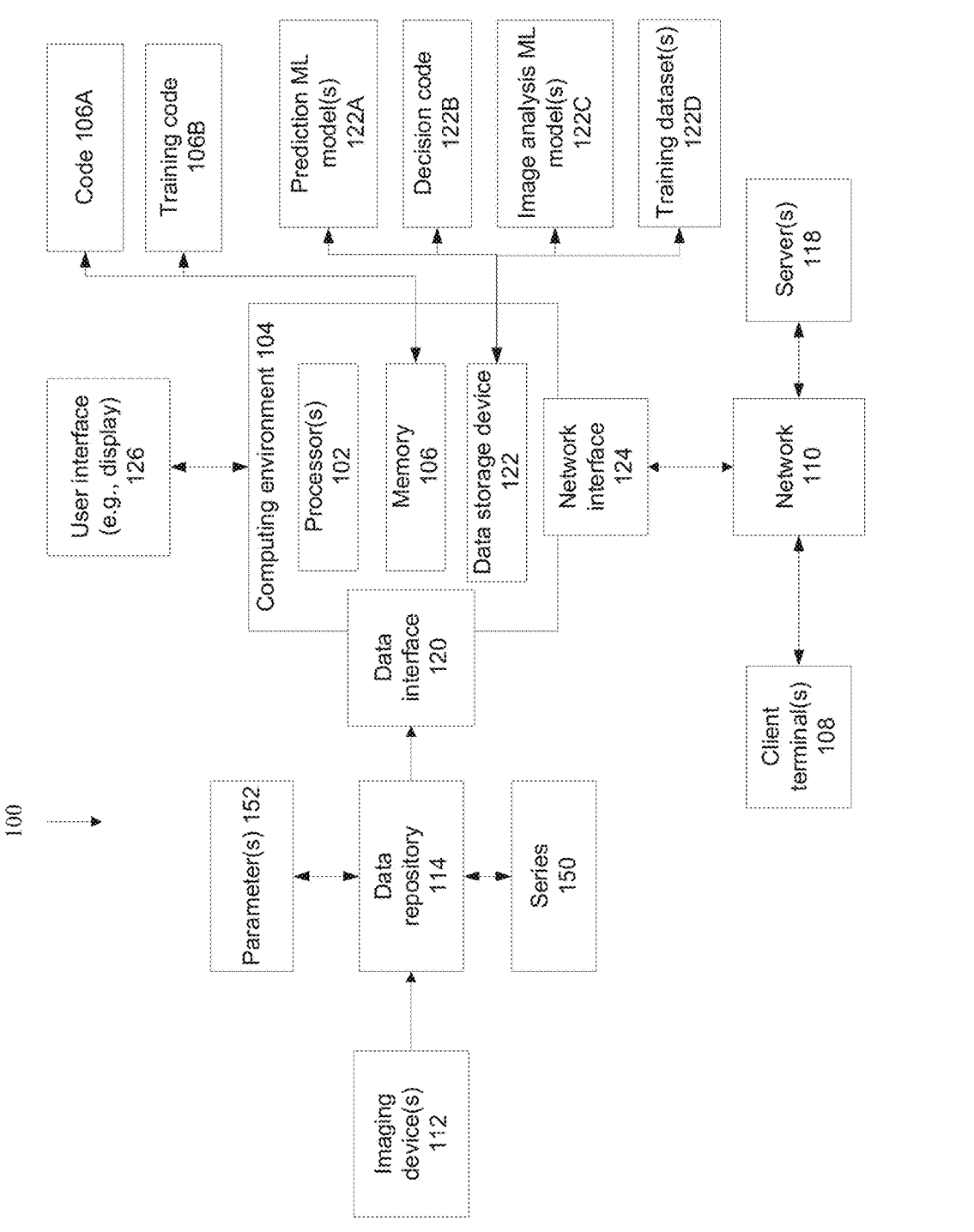
FIG. 1 is a schematic of components of a system for selection of a target series of a study for feeding into an image analysis ML model including a series which is not yet available for processing, in accordance with some embodiments of the present invention.

The present invention, in some embodiments thereof, relates to analysis of medical images and, more specifically, but not exclusively, to analyzing medical images by computer vision machine learning models.

As used herein, the term series may refer to a collection of related medical images that may be acquired as part of a single imaging modality or protocol during a patient's examination. A series may be defined by a common set of acquisition parameters, such as the imaging technique, anatomical region, or imaging orientation. For example, all images in a series might pertain to a specific body part (e.g., the head, abdomen) or a particular imaging sequence (e.g., T1-weighted, T2-weighted) within an MRI study. Each series may include information about the imaging parameters, the number of images, and the order of acquisition.

As used herein, the term scan may sometimes refer to a series. The terms scan and series may sometimes be used interchangeably.

As used herein, the term study may refer to a single patient's examination or encounter. A study is a collection of one or more series that may be acquired during the same imaging session or as part of the same clinical examination. A study may include information about the patient, the study's unique identifier, and other metadata related to the patient and the examination. A study may help in grouping together the imaging data related to a specific clinical event, such as a patient's MRI, CT scan, or X-ray performed during a particular visit or for a specific medical condition. For example, the study may include multiple CT scans, each representing a series, captured at different contrast stages, such as arterial, parenchyma, and venous.

As used herein, the term arrival of a series refers to the series becoming available for processing.

As used herein, the terms optimal series, target series, and optimal target series (which are selected for being fed into the image analysis ML model) are used interchangeably.

An aspect of some embodiments of the present invention relates to systems, methods, computing devices, and/or code instructions (stored on a data storage device and executable by one or more processors) for selecting one or more target series of a study of multiple series of medical images (e.g., x-ray, CT, MRI) of a subject for feeding into one or more image analysis machine learning models (e.g., that detect clinical features, detect lesions, perform measurements, perform quantification, and the like). At any point in time, there may be different states on availability of series of the study, for example, at least one series which is not yet available for processing and at least one series which is available for processing (other cases are described below). A time when at least one series of the study which is not yet available for processing, will be available for processing, is predicted, for example, by a prediction machine learning (ML) model. One or more parameters (e.g., metadata, properties of the image scan) of the series which is not yet available for processing may be predicted, for example, by the prediction ML model. Parameter(s) for series which are available may be obtained, for example, by accessing the metadata and/or analyzing the image scan itself. A performance of the image analysis machine learning model for each series of the study including series which are not yet available for processing, is predicted, for example, as described with reference to U.S. patent application Ser. No. 18/374,103 filed on Sep. 28, 2023, the content of which is incorporated herein by reference in its entirety. Optionally, resource utilization of a computer implementing inference by the image analysis ML model for each series of the study is computed. A target series may be selected according to a combination of the predicted time and the parameter(s) including predicted parameter(s), and optionally according to the predicted performance and/or predicted utilization. The performance of the image analysis ML model (e.g., specificity and/or sensitivity) may vary for different image analysis ML models such as trained to identify different target features in images, for example, one image analysis ML model is trained to detect cancerous growth, while another image analysis ML model is trained to detect tumors of metastatic cancer, and another image analysis ML model is trained to detect bleeding in the brain. The performance of a specific image analysis ML model may vary according to different parameters, for example, detection of cancerous lesions may be higher for a series having a small slice thickness than for a series having a larger slice thickness. For example, a score is computed for each series, including series available for processing and series not yet available for processing. The score may be computed as a function of the combination of predicted time and/or parameters (predicted and/or available) and optionally according to the predicted performance and/or predicted utilization. The target series may be selected as the series with highest score. In the case of multiple target series, each series may be scheduled for processing by the image analysis machine learning model, for example, according to decreasing scores associated with each series. In response to the target series not yet available for processing, a processor executing code may wait for the target series to become available for processing. In response to the target series being available for processing, the processor may feed the target series into an image analysis machine learning model.

An aspect of some embodiments of the present invention relates to systems, methods, computing devices, and/or code instructions (stored on a data storage device and executable by one or more processors) for selecting one or more target series of a study of multiple series of medical images (e.g., x-ray, CT, MRI) of a subject for feeding into one or more image analysis machine learning models (e.g., that detect clinical features, detect lesions, perform measurements, perform quantification, and the like). The following features are performed in response to an indication of an end-of-study (EOS) of a study of multiple series, where all the series are available for processing. For each respective series of the study, parameter(s) (e.g., of metadata and/or properties of medical images of the respective series) of the respective series are obtained, and a performance of an image analysis machine learning model being fed the respective series is predicted, for example, as described with reference to U.S. patent application Ser. No. 18/374,103 filed on Sep. 28, 2023. Optionally, resource utilization of a computer implementing inference by the image analysis ML model is predicted for each respective series of the study. For each respective study, a combination of the parameter(s) and the predicted performance computed, and optionally the predicted resource utilization, is computed. A target series is selected from the multiple series of the study according to the combination of the parameter(s) and the predicted performance computed, and optionally the predicted resource utilization, computed for each respective series. The target series is fed into the image analysis machine learning model. Optionally, a score is assigned to each respective series according to the computed combination. The series of the study may be sequentially fed into the image analysis ML model according to a ranking of the scores assigned to each series (e.g., decreasing scores). Series with scores below a threshold may be ignored and not fed into the image analysis ML model.

At least some embodiments described herein address the technical problem of improving efficiency of a computer that runs one or more image analysis machine learning models for analyzing medical images. For example, improving utilization of processors of the computer, improving utilization of memory of the computer, improving utilization of data storage accessed by the computer, reducing processing time (e.g., to obtain an outcome by the ML model), and the like. The technical problem is complex in that one or more series of a study which are to be processed by the image analysis machine learning models are not yet available for processing, making it more difficult to determine for example if it is more efficient to wait for a series to become available for processing or process a different series that is currently available for processing. At least some embodiments described herein improve the technical field of computational performance, by improving efficiency of a computer that runs one or more image analysis machine learning models for analyzing medical images.

At least some embodiments described herein improve upon prior approaches for using image analysis machine learning models for analyzing medical images. Typically radiological work flow presumes that processing will start only after the completion of the entire study (there is anecdotal evidence that, in some cases, processing has been delayed for hours merely because a technician forgot to close a given study), or after the arrival of a preconfigured series that is specifically acquired for the image analysis ML model. Usually, once the study is completed, different ML models are activated manually in an ad hoc manner.

Medical imaging studies (e.g., CT and MRI) may include multiple different series. Each series may include medical images captured with different parameters. For example, CT studies include series with different reconstruction planes, different convolutional kernels, different slice thickness, and different contrast phase. Typically, all the series are stored in the PACS systems, which archive medical images and distribute them to the different users. Image analysis machine learning models are developed for example, to automatically analyze the series in order to identify clinically relevant findings, such as to help radiologists. For example, to detect tumors, detect a blockage in a blood vessel, detect excess fluid in the lungs, and the like. Due to the higher number of series which are generated, and the many available types of image analysis machine learning models that are capable of analyzing these series, the challenge is determining which series is to be analyzed by which image analysis machine learning model and when the series is to be analyzed. Simply feeding each series into each image analysis machine learning model is not practical, since there are not enough computational resources available to perform such analysis in a short enough amount of time to enable clinical decisions to be made.

For example, a machine learning model that provides diagnostic support may be fed a series of type A or B. It is known that B is more reliable but A arrived first. The question is, should the machine learning model wait for series B? If the machine learning model does not wait for series B and processes series A, a suboptimal result is generated. If the machine learning model does wait for series B, then, perhaps, series B will arrive too late or not arrive at all—which may prevent the healthcare team from obtaining results to make a quick clinical decision for treating the patient. Perhaps neither series A nor B will be there and the physician in charge is to be warned. Alternatively, the machine learning model may try to process both series A and series B, which may tie up the computational resources, preventing analysis of other images which may be time-critical. Moreover, there is a danger of unreliable reports based on the suboptimal data. For example, for series A which may be suboptimal in the sense that it gets more False Alarms generated by results of the image analysis ML Model; blindly combining lesions detected by series A and series B we may result in low specificity by the image analysis ML model; in other words it may be better to use series B alone.

A related technical problem is: how does the machine learning model know that a given series is of type A or B? In the perfect world, such knowledge is conveyed in the metadata that either precedes or accompanies a given series. In reality, in many cases the metadata is erroneous. Hence, the technical challenge that arises is how to correct metadata to match actual content of the given series.

Some examples of selection of the target series based on embodiments described herein are now provided:

In one example, the image analysis ML model is trained to analyze images for detection of vessel-occlusion. The study includes 3 series in the following order: non-IV contrast series at time 0, thick series (5 mm slices, at time 2 min) and thin series (0.6 mm slices, at time 2.5 min). The series without IV contrast will be avoided (e.g., not further processed in response to a relevancy check). A score for the available second thick series will be calculated. A decision will be made to wait for the next predicted thin-slice series (which is not available). As the thin series arrives, new scores will be calculated and the series will be selected as the target series. In this example, the target series with IV contrast and thin slices will be selected as fed into the image analysis ML model for analysis to detect vessel-occlusion. It is noted that although this approach delayed the turnaround time (TAT) by 0.5 min, the overall performance of the image analysis ML model has increased. The potential vessel-occlusion will be detected with significantly improved sensitivity.

In another example, the image analysis ML model is trained to analyse images to detect a pulmonary embolism (PE). The study includes 3 series: A series without IV contrast (at time 0), a series with IV contrast depicting the abdomen and the lower part of the lungs (at time 2 min), and a series (with IV contrast) depicting the full chest (at time 4 min). The first series will be avoided (e.g., not further processed in response to a relevancy check). The second series is a valid option, but since the list of predicted series includes a series that contains the full lungs, a decision will be made to wait for it. When the third series arrives, a decision will be made to analyse and report the result. It is noted that in case a full-chest series was not expected, the partial chest series is selected without waiting for the full-chest series. Another note, in the event that a full-chest series was not forthcoming (from some reason, although this is expected), the partial-chest series would have been selected once the study was completed (i.e. end of series is reached).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
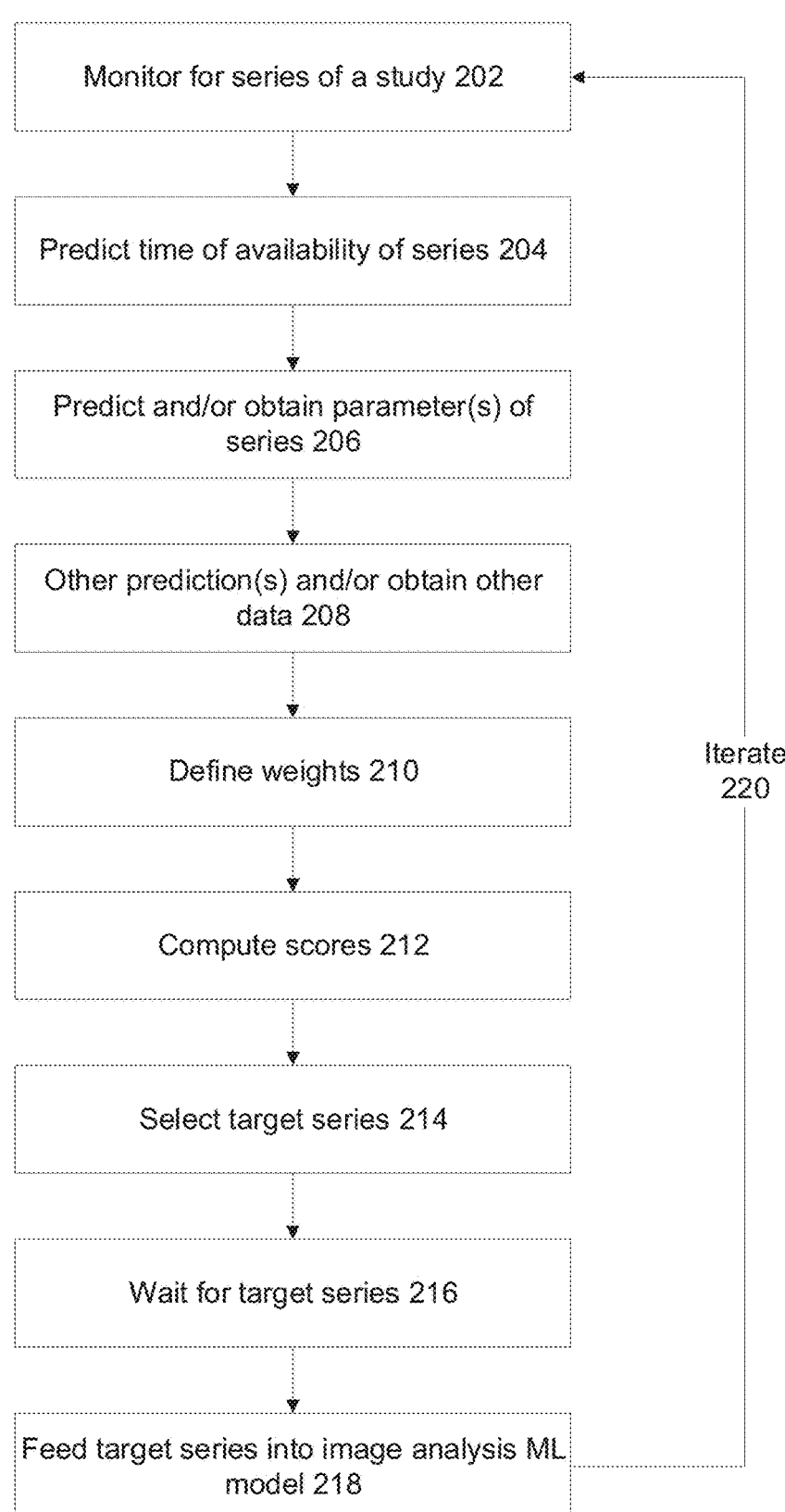
FIG. 2 is a flowchart of a method of selection of a target series of a study for feeding into an image analysis ML model including a series which is not yet available for processing, in accordance with some embodiments of the present invention.
Figure 3:
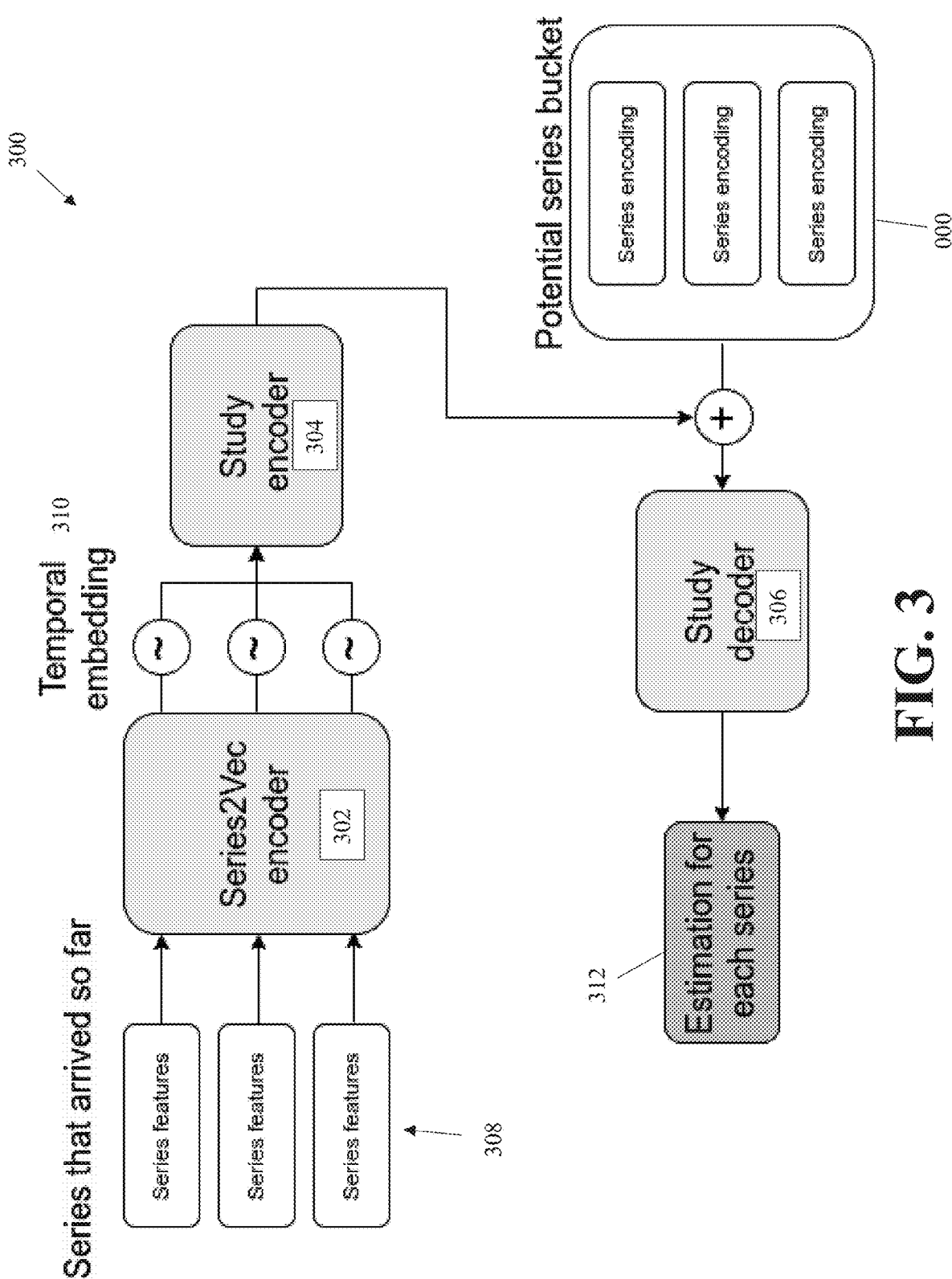
FIG. 3 is a schematic of an exemplary architecture of a prediction ML model 300, in accordance with some embodiments of the present invention.
Figure 4:
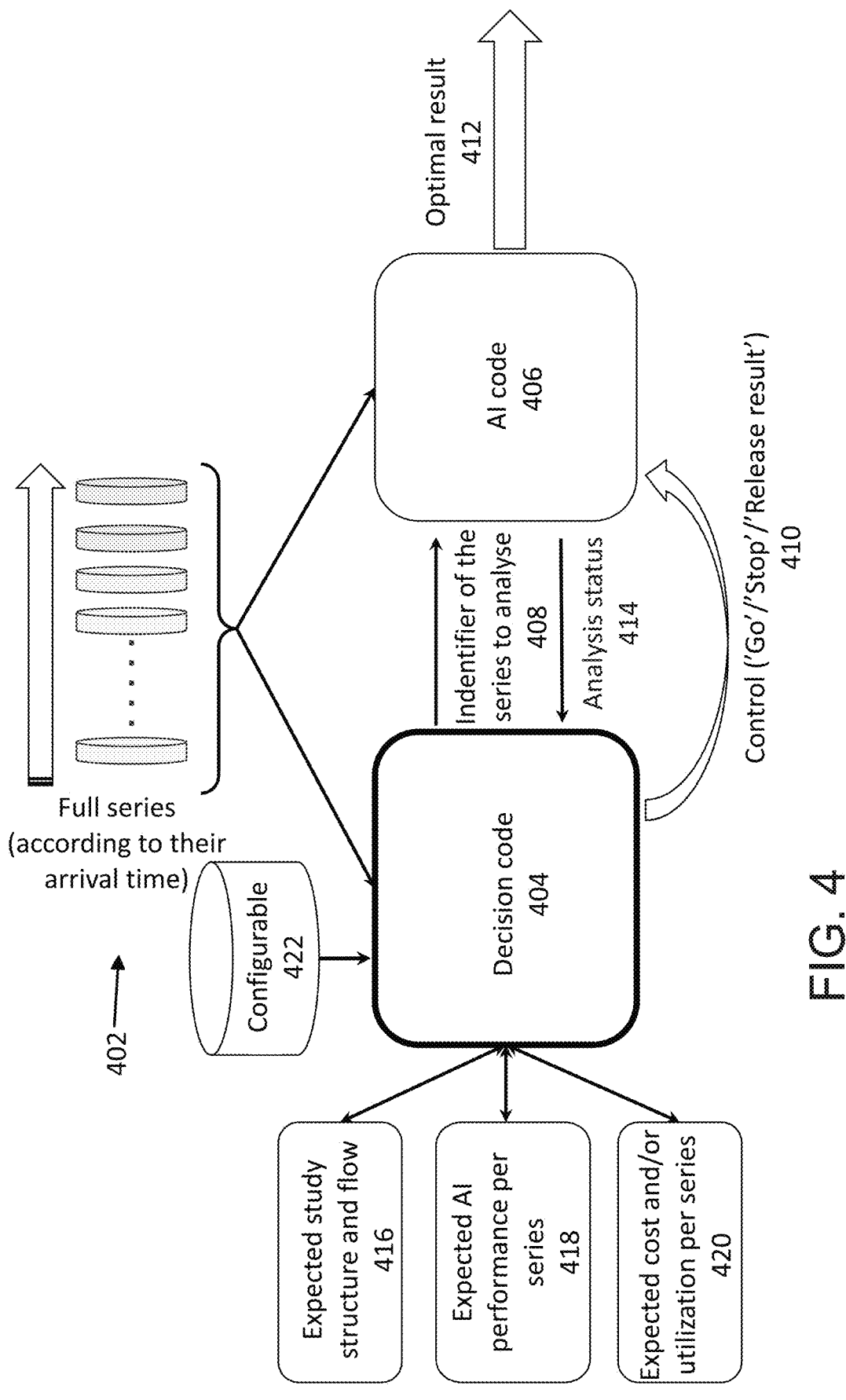
FIG. 4 is a schematic of an exemplary data flow for selection of an optimal series for feeding to an image analysis ML model, in accordance with some embodiments of the present invention.
Figure 5:
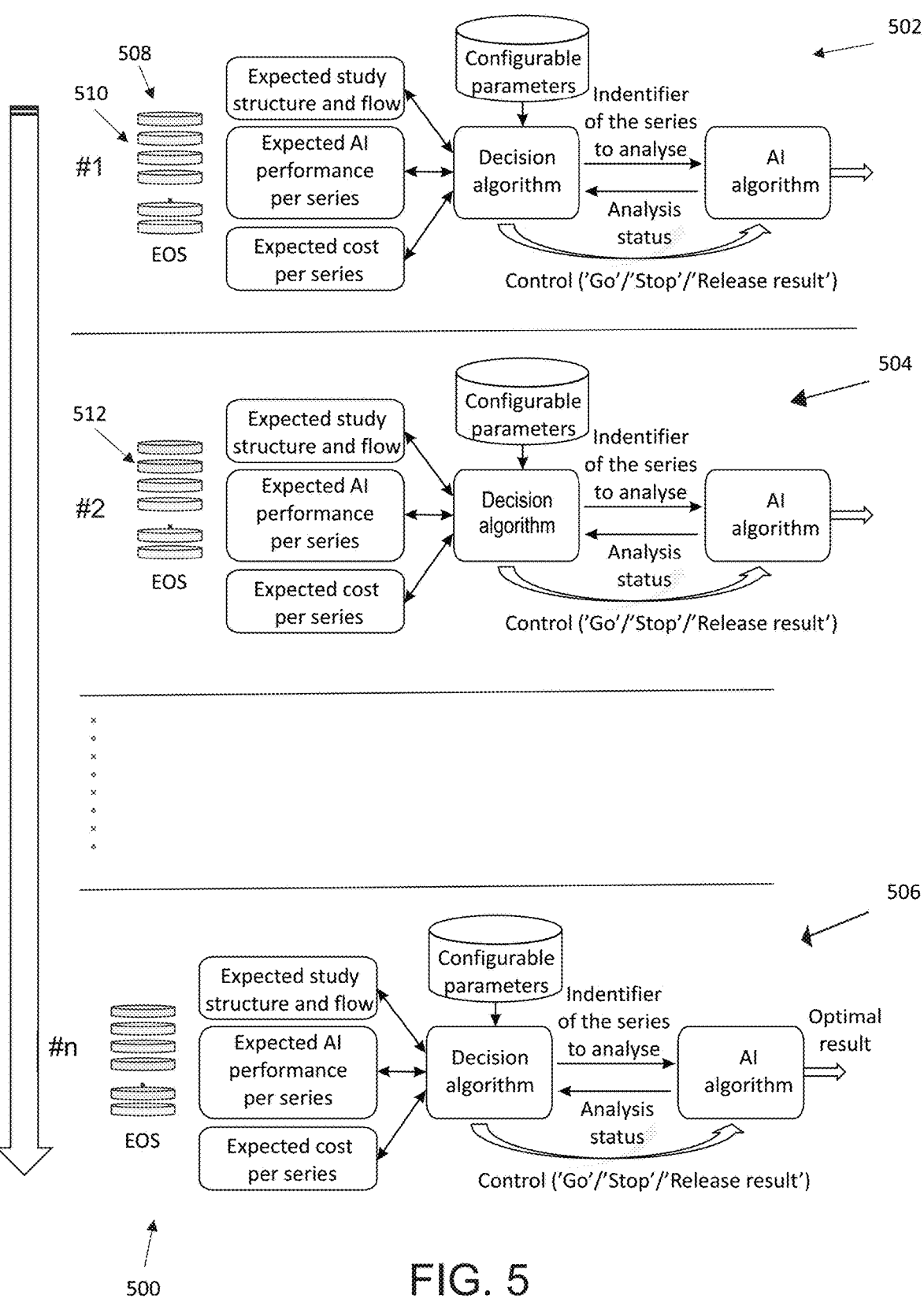
FIG. 5 is a schematic of an exemplary time flow of the data flow described with reference to FIG. 4, in accordance with some embodiments of the present invention.
Figure 6:
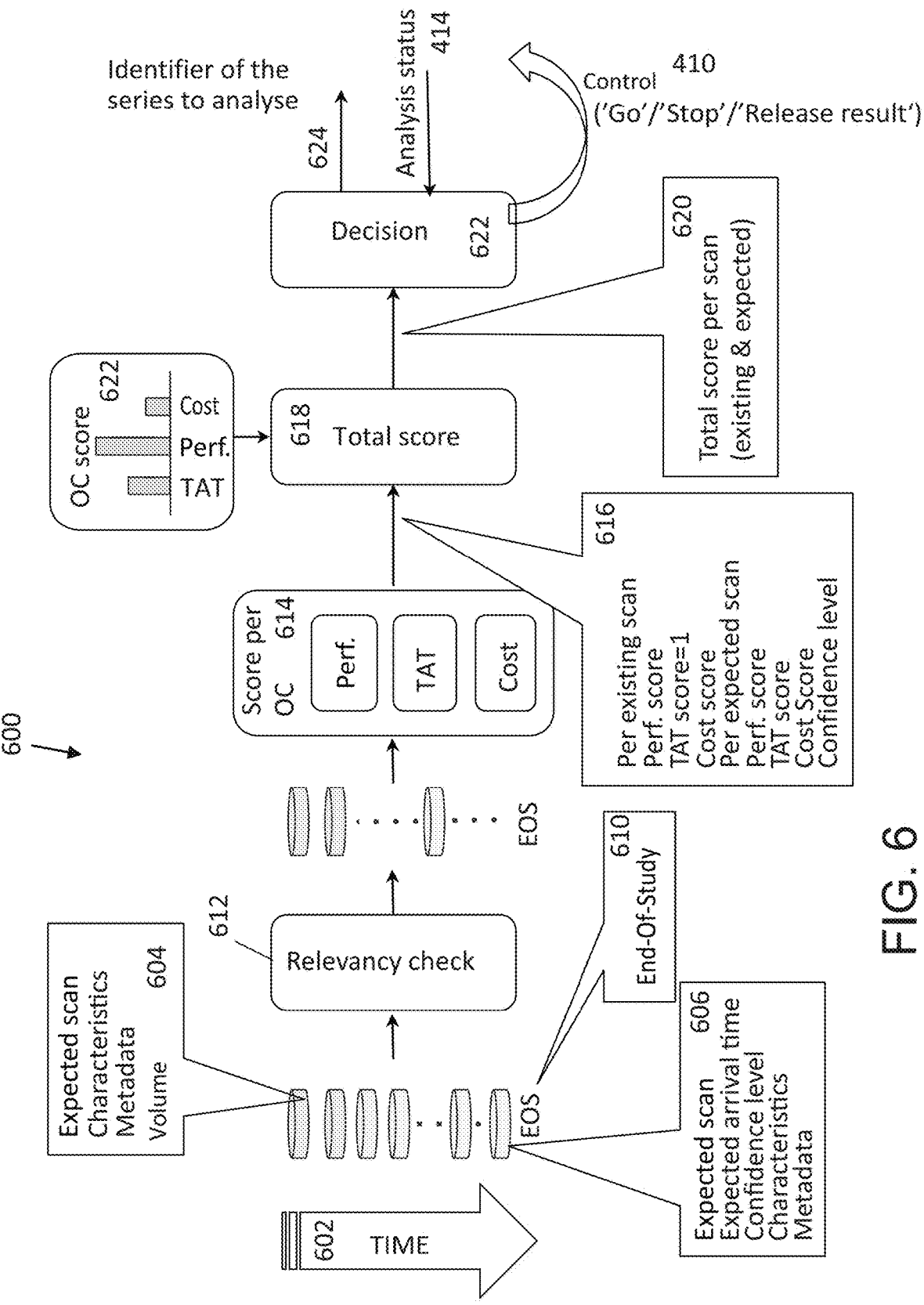
FIG. 6 is a schematic of another exemplary data flow for selection of a target series based on computed scores, in accordance with some embodiments of the present invention.
Figure 7:
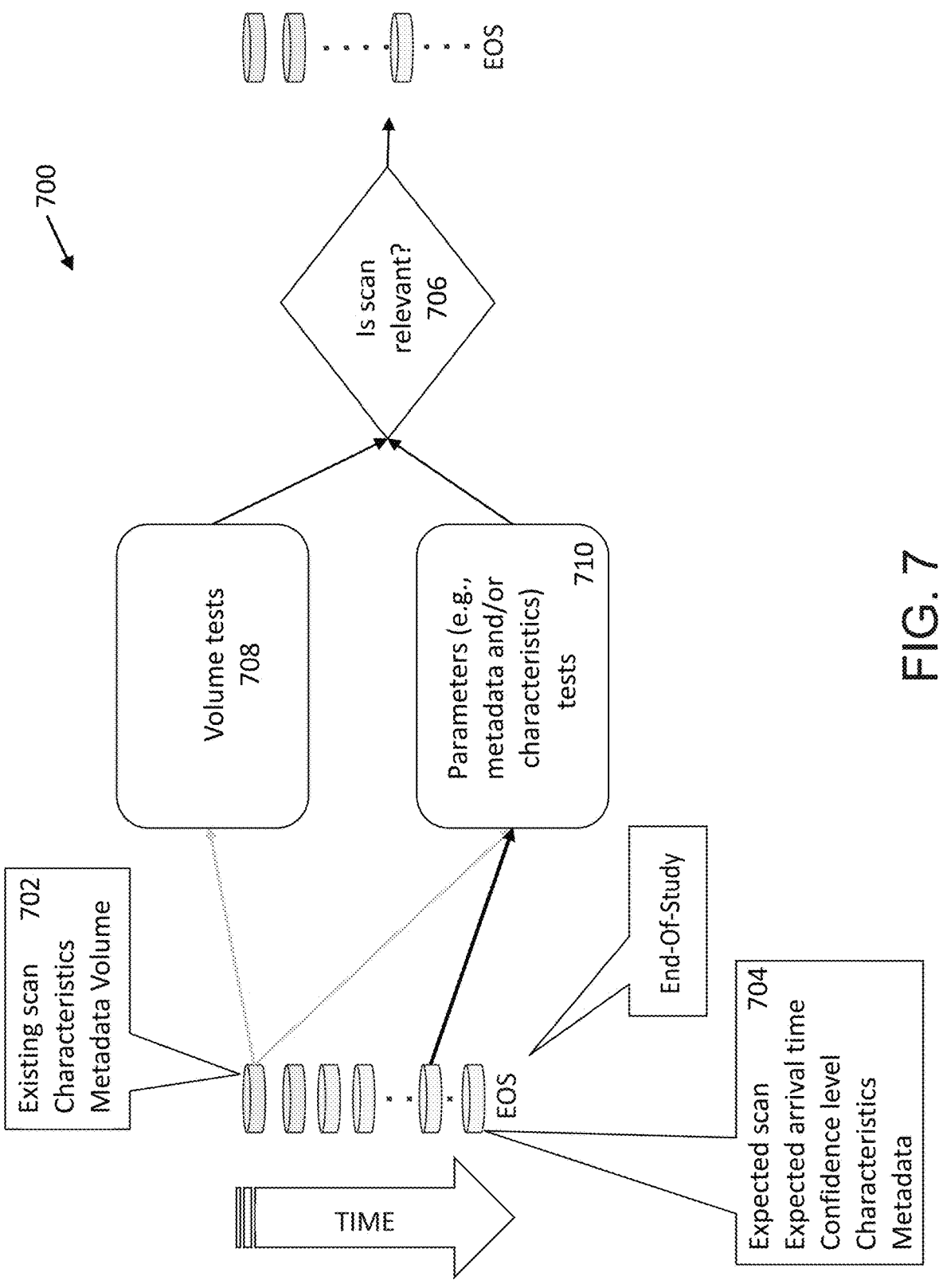
FIG. 7 is a schematic of an exemplary data flow for performing a relevancy check on a series which is not yet available for processing and/or on a series which is available for processing, in accordance with some embodiments of the present invention.

Reference is now made to FIG. 1, which is a schematic of components of a system 100 for selection of a target series of a study for feeding into an image analysis ML model including a series which is not yet available for processing, in accordance with some embodiments of the present invention. Reference is also made to FIG. 2, which is a flowchart of a method of selection of a target series of a study for feeding into an image analysis ML model including a series which is not yet available for processing, in accordance with some embodiments of the present invention. Reference is also made to FIG. 3, which is a schematic of an exemplary architecture of a prediction ML model 300, in accordance with some embodiments of the present invention. Reference is also made to FIG. 4, which is a schematic of an exemplary data flow 400 for selection of an optimal series for feeding to an image analysis ML model, in accordance with some embodiments of the present invention. Reference is also made to FIG. 5, which is a schematic of an exemplary time flow 500 of data flow 400 described with reference to FIG. 4, in accordance with some embodiments of the present invention. Reference is also made to FIG. 6, which is a schematic of another exemplary data flow 600 for selection of a target series based on computed scores, in accordance with some embodiments of the present invention. Reference is also made to FIG. 7, which is a schematic of an exemplary data flow 700 for performing a relevancy check on a series which is not yet available for processing and/or on a series which is available for processing, in accordance with some embodiments of the present invention.

System 100 may implement the acts of the method described with reference to FIGS. 2-7, optionally by a processor(s) 102 of a computing environment 104 executing code instructions stored in a memory 106.

Computing environment 104 may be implemented as, for example, a server, a virtual server, a radiology workstation, a virtual machine, a computing cloud, and a client terminal. Computing 104 may include add-on to a radiology workstation and/or a picture archiving and communication system (PACS) server.

Computing environment 104 may include locally stored software that performs one or more of the acts described with reference to FIGS. 2-7, and/or may act as one or more servers (e.g., network server, web server, a computing cloud, virtual server) that provides services (e.g., one or more of the acts described with reference to FIGS. 2-7) to one or more client terminals 108 (e.g., remotely radiology workstations, remote PACS servers, remote electronic medical record (EMR) servers) over a network 110, for example, providing software as a service (SaaS) to the client terminal(s) 108, providing an application for local download to the client terminal(s) 108, as an add-on to a web browser and/or a medical imaging viewer application, and/or providing functions using a remote access session to the client terminals 108, such as through a web browser.

Different architectures based on system 100 may be implemented.

In one example, computing environment 104 provides centralized services, for example, for different studies originating from different image device(s) 112 which may be in different locations. Computing environment 104 may execute prediction ML model(s) 122A and/or decision code 122B to determine which series to feed into image analysis LM model(s) 122C, as described herein. Computing environment 104 may run image analysis ML model(s) 122C, or may instruct feeding of the selected series to image analysis ML model(s) 122C running on another remote device. Parameter(s) of the study and/or series, (e.g., metadata and others as described herein) may be provided to computing environment 104, for example, via an API, a local application, via the PACS server, and/or transmitted using a suitable transmission protocol. The outcome of image analysis ML model(s) 122C may be provided, for example, to client terminal(s) 108 for presentation on a display and/or local storage, feeding into another process, stored in association with the PACS server, and/or stored by computing environment 104.

In another example, computing environment 104 provides localized services, for example, for analyzing studies from a same imaging device 112, and/or for a same server (e.g., PACS) which may store images from different image devices 112 in a common location (e.g., same radiology department). For example, computing environment 104 includes code locally stored and/or locally executed by a radiology workstation, and/or a PACS server. The code may be a plug-in and/or add-on, to provide additional features of improving computational efficiency of computing environment 104 that runs one or more image analysis ML model(s) 122C for selecting which series is to be analyzed. Computing environment 104 may execute prediction ML model(s) 122A and/or decision code 122B to determine which series to feed into image analysis LM model(s) 122C, as described herein. Computing environment 104 may run image analysis ML model(s) 122C, or may instruct feeding of the selected series to image analysis ML model(s) 122C running on another remote device. The outcomes of image analysis ML model(s) 122C may be presented on a display (e.g., user interface 126) of computing environment 104, locally stored, sent to another device for storage (e.g., PACS server), and/or fed into another application (e.g., automated deployment of computer vision ML model(s)).

Computing environment 104 may generate one or more training datasets 122D, as described herein. Computing environment 104 may perform centralized training of one or more prediction ML models 122A that predicts parameter(s) for series which are not yet available for processing, and/or may perform centralized training of decision code 122B implemented as a machine learning model, using training dataset(s) 122D. Alternatively, training of prediction ML models 122A and/or decision code 122B is performed by another computing device, and inference using prediction ML models 122A and/or decision code 122B is centrally performed by computing environment 104.

The data for the records of training dataset(s) 122D may be provided by different client terminals 108 and/or servers 118 and/or may be from different imaging device(s) 112. For example, different specific training datasets may be created, for example, per site, per imaging modality, and/or per types of image analysis ML model 122C. As described herein, the selection of a specific series may depend on the type of image analysis ML model 122C that will be fed a specific series.

ML model(s) described herein may be implemented using different architectures, for example, a binary classifier, a multi-class classifier, a detector, one or more neural networks of various architectures (e.g., convolutional, fully connected, deep, encoder-decoder, recurrent, transformer, graph, combination of multiple architectures), support vector machines (SVM), logistic regression, k-nearest neighbor, decision trees, boosting, random forest, a regressor and the like and/or any other commercial or open source package allowing regression, classification, dimensional reduction, supervised, unsupervised, semi-supervised, and/or reinforcement learning. Machine learning models may be trained using supervised approaches and/or unsupervised approaches.

Imaging device(s) 112 captures and provides the series 150 of one or more studies. Examples of imaging device(s) 112 include: a magnetic resonance imaging (MRI)), CT scanner, ultrasound machine, mammogram, PET scanner and x-ray machine.

Series 150 of one or more studies of medical images captured by one or more image devices 112 may be stored, for example, in data repository 114, server(s) 118 (e.g., PACS server), data storage device(s) 122, remotely by a computing cloud, and the like.

Training dataset(s) 122D may be stored in a data repository 114 and/or data storage device 122, for example, a storage server, a computing cloud, virtual memory, and a hard disk. Training dataset(s) 122D may be used for training prediction ML model(s) 122A and/or decision code 122B, optionally dynamically as more studies are generated, as described herein. Training dataset(s) 122D may be dynamically created using newly obtained series 150 and/or studies, as described herein. It is noted that training dataset(s) 122C may be stored by a server 118, accessibly by computing environment 104 over network 110.

Computing environment 104 may receive series 150 and/or parameter(s) (e.g., metadata and/or other parameters of the study and/or series as described herein) 152, for example using one or more data interfaces 120, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)).

Parameters 152 may be obtained, for example, from metadata of images 150, from medical records of the patients (e.g., stored in electronic health records (HER), which may be hosted by a EHR server), from a PACS server, by analyzing the images themselves (in which case erroneous metadata may be corrected by the results of the analysis), and/or may be estimated using prediction ML model(s) 122A for series which are not yet available for processing (e.g., have not yet arrives, have not yet been captures, do not yet exist).

Hardware processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 (also referred to herein as a program store, and/or data storage device) stores code instruction for execution by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). For example, memory 106 may store code 106A that implement one or more acts and/or features of the method described with reference to FIGS. 2-7 and/or training code 106B that trains one or more of the ML models described herein.

Computing environment 104 may include a data storage device 122 for storing data, for example, one or more prediction ML models 122A for predicting time of arrival and/or parameter(s) of series which are not yet available for processing, one or more decision code 122B for selecting which series to feed into image analysis ML model(s) 122C, one or more image analysis ML model(s) 122C that analyze the selected series, and/or one or more training datasets 122D as described herein. Data storage device 122 may be implemented as, for example, a memory, a local hard-drive, a removable storage device, an optical disk, a storage device, and/or as a remote server and/or computing cloud (e.g., accessed over network 110). It is noted that 122A-D may be stored in data storage device 122, with executing portions loaded into memory 106 for execution by processor(s) 102.

Computing environment 104 may include a network interface 124 for connecting to a network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing environment 104 may access one or more remote servers 118 using network 110, for example, to obtain and/or provide series 150, parameters 152, an updated version of code 106A, training code 106B, ML model(s) 122A-C, and the like.

It is noted that data interface 120 and network interface 124 may exist as two independent interfaces (e.g., two network ports), as two virtual interfaces on a common physical interface (e.g., virtual networks on a common network port), and/or integrated into a single interface (e.g., network interface). Computing environment 104 may communicate using network 110 (or another communication channel, such as through a direct link (e.g., cable, wireless) and/or indirect link (e.g., via an intermediary computing device such as a server, and/or via a storage device) with one or more of:

Client terminal(s) 108, for example, for enabling different users (e.g., radiologists) to each view results of image analysis ML model(s) 122C analysis different selected series.

Server 118, for example, PACS, which may store parameters 152 and/or series 152 of studies of medical images captured by imaging device(s) 112.

Imaging device 112 and/or data repository 114 that provide series 150 of medical images.

One or more devices hosting parameters 152, for example, PACS server, EHR server, and the like.

Computing environment 104 and/or client terminal(s) 108 and/or server(s) 118 include and/or are in communication with a user interface(s) 126 that includes a mechanism designed for a user to enter data and/or view data (e.g., the outcome of image analysis ML model(s) 122C analysis the selected series). Exemplary user interfaces 126 include, for example, one or more of, a touchscreen, a display, a keyboard, a mouse, and voice activated software using speakers and microphone.

Referring now back to FIG. 2, at 202, monitoring for one or more series of a study which are not available for processing (e.g., does not yet exist such as has not yet been captured, has not yet downloaded to a storage device, has not yet been signed off), becoming available for processing (e.g., capture of the series is complete, the series has completed downloading and is accessing for processing, the series has been signed off).

The monitoring may be performed during one or more states such as: no series of the study is available for processing, at least one series is not yet available for processing and at least one series is available for processing, and all series are available for processing.

Whether one or more series are not yet available for processing may be based on a prediction of whether one or more series are expected to arrive, as described herein.

A series may not yet be available for processing, for example, since the series has not yet been captured (e.g., CT scan has not yet been performed, such as waiting for a certain contrast stage), a technician has not yet signed off on the series, and delays in transmission of the data of the series such as from the CT scanner to the PACS server.

The series being available for processing may refer to the series being accessible for being fed into an automated process for automated analysis, for example, into a detector neural network trained to detect certain clinical features.

Optionally, one or more actions may be performed in response to arrival of a series. Optionally, the series is analyzed to determine actual value of one or more parameters, which were previously predicted for the series when the series was unavailable, as described with reference to 206. The predicted parameter(s) may be corrected to the actual value of the parameter(s). The corrected parameter(s) may be used in other computations described herein in place of the predicted parameters. For example, metadata of a series may indicate that images of the series have been acquired without the presence of any contrast agent. Accordingly, this series may be deemed to be of a low priority in the context of analysis by a ML model designed to analyze blood vessels. However, a fast automated check of the images in the series (e.g., by image processing code and/or an appropriately trained ML model) determine the presence of the contrast agent. In response, the selection of the series may be adjusted and/or corrected by considering the corrected parameter(s).

At 204, a time when at least one series of the study which is not yet available for processing, will be available for processing, is predicted.

The predicted time may be, for example, amount of time from a reference such as a current time and/or the time of arrival of the most recent series, for example, in about 30 seconds, or about 1 minute, or about 5 minutes, and the like. Alternatively or additionally, the predicted time is according to a real time clock.

The time may be predicted by the prediction ML model described with reference to 206.

For a series which is available for processing, the time at which the series was made available for processing may be recorded. For example, the time at which transmittable for storage on the PACS has completed.

At 206, one or more parameters of one or more series which are not yet available for processing are predicted. For series which are available for processing, the parameter(s) are obtained, for example, from metadata associated with the series and/or by analyzing the series using a program (e.g., machine learning model, image analysis code, and the like).

Parameter(s) of the study may be obtained.

The parameter(s) of the study may be different than parameter(s) of the series of the study.

Examples of parameter(s) of the study and/or series (as relevant) include: metadata, values and/or parameters included in the metadata, properties of the scan (e.g., reconstruction plane, convolutional kernels, slice thickness), properties of the anatomy depicted in the images (e.g., contrast phase, body organs), and the like, protocol name, reason for the study and/or series, description of study and/or description of the series (e.g., contrast phase, anatomy depicted in the study, reconstruction parameters).

Optionally, the estimated parameter(s) of one or more series which are not yet available for processing is obtained as an outcome of a prediction ML model. The prediction ML model may be fed one or more parameters of the study and/or parameter(s) of one or more series which are available for processing and/or time(s) when the series became available for processing.

Alternatively or additionally, the prediction ML model generates the predicted time when the series which is not yet available for processing, will become available for processing.

Referring now back to FIG. 3, the exemplary architecture of prediction ML model 300 includes a series encoder 302, a time stamped encoder (also referred to as a study encoder) 304, and a decoder 306.

Series encoder 302 receives the parameter(s) of the series and/or study 308 as input, and generates an outcome of an encoded vector 310 representing the series (also referred to as temporal embedding). Series encoder 302 may be referred to as series2vec, which may analogous to word2vec used in language models (e.g., as described with reference to Mikolov et al, 2013, incorporated herein by reference in its entirety).

Time stamped encoder 304 receives encoded vector 310 as input and also receives as input the time of arrival of each series that is available for processing (also referred to as temporal information and/or temporal embedding). Time stamped encoder 304 generates an encoded study.

Decoder 306 receives the encoded study as input, and generates an outcome 312 of a prediction of a time of arrival of at least one series and/or a prediction of parameter(s) of the series which is not yet available for processing. The predictions may be for each series until an end of the study (obtained and/or predicted as described herein). Decoder 306 may generate a probability for each series. For example, decoder 306 may generate a matrix (denoted P) having two rows and the number of columns equal to the number of possible series in the study. The entry denoted $p1i$ of this matrix may indicate the expected time of arrival of the series denoted i. The entry $p2i$ may indicate the probability that estimate $p1i$ is correct. Outcome 312 of detector 306 may be computed at any point in time, for example, before the arrival of any series and/or at any point thereafter until the end of the study.

Architecture of prediction ML model 300 may be an adaptation of large language models (LLMs) used in natural language processing (NLP), e.g., BERT (Devlin 2018), GPT-3 (Brown 2020). The encoder-decoder part of these models is based on the transformers architecture (Vaswani 2017). The temporal embedding may be an adaptation to the positional embedding used in these LLMs. To get the output, a list of predefined series "types" may be used and add, one by one, to the result of the encoder.

Referring now back to FIG. 2, at 206, the prediction ML model may be trained on a training dataset of multiple records created from historical studies of multiple subjects, where each study includes one or more series. A record may include at least one parameter of a sample study, at least one parameter of a sample series of the sample study, and a time of arrival of the sample series. One or more records may be created at different reference times of the sample study, where parameter(s) and/or times of series prior to the reference time as designated as input, and parameters and/or times of series after the reference time are designated as ground truth.

The prediction ML model may be trained in a semi-supervised approach. For example, for each study in a training set that includes indications of past series arrival times and metadata and/or other parameters, the output of the prediction ML model may be computed for example for some random, non empty, consecutive subset of the full study data. The output of the prediction ML model may be compared to the real series that arrived and their arrival time. A loss can be calculated from this comparison (e.g., using a loss function), and used for adaptation of the prediction ML model. It should be noted that, using this approach, huge quantities of training data may be available, without any need, or reduced need, for the manual data annotation.

Different modes of training may be adopted. For example, one time training for a large body of historical data (either acquired at a same site (e.g., hospital, imaging center) or gathered from many different sites). Alternatively, the prediction ML model may be tuned continuously or occasionally with weight of the older data being reduced exponentially. Some exemplary training approaches are described with reference to:

Biesialska, Magdalena, Katarzyna Biesialska, and Marta R. Costa-Jussa. "Continual lifelong learning in natural language processing: A survey." arXiv preprint arXiv: 2012.09823 (2020).

Brown, Tom, et al. "Language models are few-shot learners." Advances in neural information processing systems 33 (2020): 1877-1901.

Devlin, Jacob, et al. "Bert: Pre-training of deep bidirectional transformers for language understanding." arXiv preprint arXiv: 1810.04805 (2018).

Mikolov, Tomas, et al. "Efficient estimation of word representations in vector space." arXiv preprint arXiv: 1301.3781 (2013).

Vaswani, Ashish, et al. "Attention is all you need." Advances in neural information processing systems 30 (2017).

At 208, one or more other predictions may be computed and/or data may be obtained. The predictions may be for each series of the study, including series not yet available for processing series and series that are available for processing.

Optionally, resource utilization of a processor (e.g., computer) implementing inference by an image analysis ML model for each series of the study, may be computed. Example of performance metrics indicating resource utilization include: processor utilization, processing time, and memory utilization. Resource utilization may include financial costs of the analysis by the image analysis ML model, for example, fees paid for a service provider that provides the image analysis ML model for use (e.g., fee per analysis), fees paid to a radiologist for analyzing the outcome of the image analysis ML model, and the like.

For series which are not yet available for processing, resource utilization may be predicted, for example, by a resource utilization ML model trained on a training dataset of multiple records, where a record includes an indication of a sample series (e.g., parameter(s) of the series, the series itself) and a ground truth of one or more performance metrics of the processor and/or computer measuring while the image analysis ML model is processing the sample series.

For series which are available for processing, resource utilization may be measured.

Alternatively or additionally, for series which are not yet available for processing a performance of the image analysis machine learning model is predicted for each series of the study, including not yet available series and available series. The performance of the image analysis machine learning model (also referred to as a computer vision machine learning model) may be predicted, for example, as described with reference to U.S. patent application Ser. No. 18/374, 103 filed on Sep. 28, 2023, the content of which is incorporated herein by reference in its entirety.

Alternatively, or additionally, an end-of-study (EOS) is predicted. The predicted EOS may be used in one or more ways, for example, to determine when to stop predictions for future series expected to be available for processing, to determine how long to wait for predicted series to arrive (e.g., if predicted EOS occurred then no more series are predicted to arrive and wait for future series may be terminated), and the like. The EOS may be predicted when additional series are predicted to arrive, for example, when the study indicates that additional series are expected. When all series have become available for processing (e.g., according to the study structure information), the EOS may be determined as the time of when the last series became available for processing (e.g., the predicted EOS is replaced by the actual EOS).

At 210, one or more weights are defined for the predicted time for a series and/or for the parameter(s) of the series. Optionally, weight(s) are defined for each series of the study, including series which are available for processing and/or series which are not yet available for processing.

The weight may be defined, for example, manually by a user, preset and stored on a dataset storage device, and/or dynamically computed such as by a set of rules, a machine learning model and the like. It is noted that, when weights are derived automatically using machine learning techniques, manual data annotation may be required, for example, at points in time—such as new series arrival—a user (e.g., physician) may manually determine the optimal target series. The manual selection information, in turn, may would be used to compute the set of weights which may be optimal.

The weight(s) for a subsequent series may be dynamically adapted according to outcome of the image analysis machine learning model analyzing at least one preceding series. For example, an ambulatory patient may be sent for a scheduled CT with no urgency indications. However, during the CT exam, the image analysis ML model may detect an incidental pulmonary embolism, triggering a change in priorities by adjusting weights.

Optionally, for the same series, multiple weights may be defined. A respective (e.g., different) weight may be defined for each one of: time when the series became available for processing, parameter(s) of the series, predicted performance of the image analysis ML model analyzing the series, and predicted resource utilization of a computer running the image analysis ML model.

Weights may control time sensitivity of obtaining the outcome of the image analysis ML model. For time sensitive cases, the weight associated with predicted time of availability of series may be set to favor series that are currently available for processing over series which are currently unavailable for processing, and/or to favor series which are predicted to be available more quickly over series which are predictable to be available after a significant amount of time. For example, for the case of an emergency such as a stroke (e.g., vascular occlusion, bleeding in brain) where time is critical for clinical decision making and/or treatment, the weights may be set to favor series which are available for processing rather than wait for predicted series which may never become available (e.g., won't be scanned) and/or may become available much later than predicted (e.g., technician forgot to sign off on the scan).

For time insensitive cases (e.g., for scans aimed at detection of cancerous lesions), de facto, the processor may wait for the study completion. However, the processor may still play vital role in the sense that that processor may determine, automatically, the optimal target series for each image analysis ML model. In addition, the processor may raise an alarm if, for one or more (e.g., some predefined) image analysis ML models, no suitable series exists for being fed into that image analysis ML model.

At 212, one or more scores may be computed for each series of the study, includes series which are not yet available for processing and series which are available or processing.

The score(s) for each series may be computed as a function of a combination, which may include two or more of: the predicted arrival time or actual arrival time, the predicted parameter(s) or actual value of the parameter(s), predicted performance of the image analysis ML model, and predicted resource utilization of the computer running the image analysis ML model. For example, a function is applied to the combination taking into account, for example, for maximizing performance, minimizing cost, and relying more on series that are available for processing that waiting for a long time for series that are not yet available for processing.

The score may further be computed based on the actual series itself when available for processing, for example, based on an analysis of the actual series. For example, a CT scan series with fewer slices may be processed faster than a CT scan with higher number of slices.

The score may further be computed based on actual analysis costs so far, for example, to minimize further costs.

For series that are not yet available for processing, the score may be impacted by the associated probability of each prediction. For example, when the optimal target series is scheduled to arrive in 5 seconds, and the probability of this prediction being correct is 10%, the processor may ignore this prediction.

Optionally, a sub-score is computed for each member of the combination. The score for the series may be computed as an aggregation of the sub-scores.

The score of the predicted series which is not yet available for processing may be re-computed in response to the predicted series becoming available for processing and/or after a predefined amount of time has elapsed such as after the predicted time when the series will become available has elapsed without the series becoming available.

Actions may be taken in response to the computation of the score(s).

Optionally, in response to a score of a certain series being higher than a score of a current series being processed by the image analysis machine learning model, processing of the current series by the image analysis machine learning model may be interrupted. Processing of the certain series by the image analysis machine learning model instead of the current series may be instructed. The change in processing is done in response to the higher score indicating better outcomes for the certain series. The certain series may be a series that was previously unavailable for processing, which became available for processing while the current series is being processed by the image analysis ML model.

Alternatively, or additionally, in response to a score of a predicted series which is not yet available for processing being higher than a score of a current series which is available for processing, the current series is not fed into the image analysis machine learning model. The processor may wait for the predicted series to be available for processing. Once the predicted series is available, the score(s) may be recomputed and/or the series may be fed into the image analysis ML model.

At 214, a target series is selected from the series which are available for processing and/or series which are not yet available for processing.

Optionally, the target series is selected according to the score, optionally weighted using the defined weights. The target series may be selected as the series with highest score and/or series with score that exceeded a threshold.

The a target series may be selected according to a combination the predicted arrival time and the parameter(s). The combination for selecting the target series may further include the predicted resource utilization of the computer running the image processing ML model and/or the predicted performance of the image processing ML model. The combination for the series may be computed according to the defined weight(s).

The target series may be selected in view of the predicted EOS. For example, when no more series are expected to become available for processing prior to the predicted EOS, the target series is selected from one of the available series. When there is significant amount of time remaining until the predicted EOS and/or one or more additional series are predicted to arrive before the predicted EOS, no target series may be current selected. The processor may wait for additional series to become available for processing. The selection of the target series may be performed when the additional series is available for processing.

Optionally, the selection of the target series is performed for each one of multiple image analysis ML models. The selection may be performed according to each specific image analysis ML model, such that different target series may be selected for different specific image analysis ML models. Each selected target series is fed into the corresponding specific image analysis ML model. For example, there may be a first ML model designed to analyze images with contrast introduced into blood vessels, and a second ML model designed to analyze images without contrast. In a study with two series, the first without contrast and the second with contrast, where both series depict the same anatomy, the first series may be selected for being fed into the second ML model and the second series may be selected for being into the first ML model.

Optionally, the selection is performed by feeding the combination into a decision code, optionally a decision machine learning model, and obtaining the target series as an outcome of the decision machine learning model. The input into the decision ML model may be an indication of the predicted time of each series that is not yet available for processing, times when other series became available for processing, predicted and/or actual parameters for each series, predicted and/or actual performance, predicted and/or actual utilization, and optionally computed scores. The decision ML model generates an indication of the selected target series as an outcome.

There may be multiple decision codes (e.g., machine learning models), for example, a respective decision ML model for each image analysis ML model. Alternatively, there may be a common decision ML model for multiple image analysis ML models. In such implementation, an indication of a specific decision ML model to which the selected target series will be fed into may be provided as an input into the decision ML model, optionally fed into the decision ML model with the combination.

The decision machine learning model may be trained on a training dataset of multiple records. A record may be defined for a sample series and/or study, including time when the sample series and/or each series became available for processing, at least one parameter of the sample series and/or study, and a ground truth indication of the selected target sample series. The record may further include an indication of performance and/or resource utilization for the sample series. The ground truth may be for a specific image analysis ML model. The record may include an indication of the specific image analysis ML model to which the ground truth is directed. Training may be done, for example, in advance, on-site, and/or combination thereof such as reinforcement learning and/or fine tuning of a pre-trained ML model using on-site data.

Fine tuning may be used, for example, to adapt the training to different times of the day, different initial diagnosis, and/or different technicians operating the imaging device that captures the series (e.g., CT technician, x-ray technician). For example, different series timing may occur during night shifts in comparison to the day shifts. Emergency department (ED) trauma cases may have different patterns than inpatient cases, etc. . . . .

The decision code may be implemented using other approaches, for example, a decision tree, probabilistic approach, and combination of the aforementioned.

Optionally, a relevancy check may be performed on one or more (e.g., each) series of the study (e.g., as described with reference to FIG. 7). A series may be excluded from being selected according to the relevancy check. The relevancy check may be to determine whether the series is suitable for being fed into one or more image analysis machine learning models and/or to determine which image analysis ML models are suitable. For the series which is not yet available for processing, the relevancy check may be performed using the predicted parameter(s). For the series which is available, the relevancy check may be performed using actual values of the parameter(s) of the series, and/or by analyzing the series which is available.

Optionally, a decision matrix (denoted D) is computed to help select the target series. Matrix D may include one row for each candidate image processing ML model, and a number of columns equal to the number of series that are currently available for processing. Each entry (denoted dij) of the matrix D may include a score representing the probability that series j is optimal for the image processing ML i. The entry with highest score, optionally for each candidate image analysis ML model, may be selected as the target series.

The technical advantage of computing scores may be the ability to choose the optimal series when all relevant factors are taken into account. For example, if the predicted time for when a series will be available for processing and cost and/or resource utilizations weights are set to zero, the best performing series (after the study is complete and all series arrive) may be selected as the target series.

At 216, in response to the target series not yet being available for processing, the processor may wait for the target series to become available for processing. The waiting may be limited, for example, up to the predicted time at which the target series is expected to become available for processing. If the predicted time has elapsed, it may be assumed that the prediction was incorrect and that the target series will not arrive, or will arrive much later. Score(s) may be re-computed as described herein, and a new target series may be re-computed.

At 218, in response to the target series being available for processing, the target series may be fed into the image analysis machine learning model. There may be multiple target series, each one of which is fed into a respective image analysis ML model, as described herein.

Examples of image analysis ML models include: for detection of clinical features such as lesions, tumors, bleeding, lung fluid, air in abdomen, broken bones, measurement of one or more anatomical features, and/or quantification of one or more features.

It is noted that there may be several different image analysis ML models aimed at performing the same task, for example, detecting cancerous growths. The different image analysis ML models may differ, for example, in terms of architecture and/or datasets used to train them. Each of the image analysis ML models performing the same task may be fed different series selected as the target series, or may be fed the same series selected as the optimal target series. For the implementation of multiple different image analysis ML models perform the same task, there may be a voting process controlling the final output. The voting process may be pretrained and/or predefined based on user preferences.

It is noted that the term image analysis ML model is meant to be exemplary and not necessarily limiting. Other automated image analysis approaches may be used which are not necessarily ML based, such as deterministic models, for example, based on analysis of extracted features, patterns of pixel intensity values, and the like.

At 220, one or more features described with reference to 202-218 may be iterated, for example, in response to another sequential series which was not yet available for processing, being available for processing. Alternatively or additionally, iterations may be performed in response to an elapsed amount of time, for example, every 10 seconds or 30 seconds, based on the assumption that new data has become available during a time interval that may impact scores and/or selection of the target series. Alternatively or additionally, iterations may be performed in response to an event, such as a change in values of parameter(s) and/or new parameter(s) becoming available. For example, a technician manually entering metadata may trigger an iteration round. Alternatively or additionally, iterations may be performed continuously.

Optionally, in each iteration, one target series is selected. In each subsequent iteration, another target series which has not been previously selected may be selected. The selected target series may be scheduled and/or queued for being fed into the image analysis machine learning model. The current target series selected in each iteration may be added to the queue, in order. Alternatively, each series that is selected (e.g., in each iteration) may be scheduled according to its score, where the highest scoring series is scheduled first, followed by series with decreasing scores.

Referring now back to FIG. 4, data flow 400 is based on, and/or includes features described with reference to FIG. 2.

Series 402 start arriving sequentially. A decision code 404 sends to AI code 406 (also referred to herein as image analysis ML model) an identifier of the selected target series 408 (when available for processing) and optionally a control message 410 after each new series arrival. The control message may be, for example, 'Go'/'Stop'/'Release results'. In response to a 'Go' message, the selected target series (indicated by series identifier 408) is analyzed by AI code 406. In response to a 'stop' message, the current analysis performed by AI code 406 is interrupted and a new 'go' control message is provided with an updated identifier of a new target series. A 'Release results' message specifies that a final decision was made and the result of the current selected series will be reported. In the event that a 'Release results' message is sent immediately after the 'Go' signal, results 412 of the selected series will be reported immediately after analysis is finished, for example, as indicated by an analysis status 414 message.

Decision code 404 may select the target series and/or generate control message 410 based on one or more of the following input data:

Available series and their parameters.

Parameters of series expected to arrive and their estimated time of arrival 416.

Estimated performance for each (available and expected) series 418.

Estimated resource utilization and/or cost for each series 420.

Configurable weights 422.

Referring now back to FIG. 5, exemplary time flow 500 of data flow 400 described with reference to FIG. 4, is depicted. Time flow 500 is based on, and/or includes features described with reference to FIG. 2.

The series arrive sequentially (denoted by #1 (502), #2 (504) . . . #n (506) timestamp in the figure). The inputs to the decision code are updated after the arrival of each series. Timestamp #1 (502) indicates the arrival of the first series in the study (this is illustrated by a lightly colored disc 508 representing the first series, and darker discs 510 for the predicted series which have not yet arrived). In timestamp 502, the relevance and optimality of the first series may be tested and a decision is made, whether the AI code should start analyzing the series or wait for a better series. In this example, the series is not optimal and a significantly better series is expected to arrive in high probability, so the AI code does not start analyzing the first series.

At the timestamp #2 (504), the next series arrives. All relevant quantities are updated, including the expected future series, their parameters and timing, and the estimated AI performance and processing cost and/or utilization for each series. In the example, the second series is not relevant for the AI code (this is indicated by a light color of a disc 512 representing the series). A new decision is made, when the new information is taken into account, whether the first (#1) series 508 should be analyzed or if it is still better to wait for a better series.

At timestamp #n (506), a new series arrives. All relevant information is updated and a decision is made that this is the optimal target series (and the chances that a better series will arrive in a sufficiently short time is low). The AI code receives successive control signals: 'go' and 'release results'. Once the processing of the optimal series is completed, the results are reported and the study will not be analyzed any longer.

Referring now back to FIG. 6, exemplary data flow 600 for selection of a target series based on computed scores is depicted. Data flow 600 is based on, and/or includes features described with reference to data flow 400 described with reference to FIG. 4, and/or features described with reference to FIG. 2.

Data flow 600 may be triggered activated after each new series becomes available for processing, when persistent values (e.g., existing scans scores) are preserved between the runs, and/or new information is obtained (e.g., scores of the new series, and the updated predicted future series which is not currently available for processing, in light of the series that was the last one to become available for processing).

At a given point in time (as represented by a time axis 602), there are several series that are available for processing (existing scans 604), and several series that are predicted but are not yet available for processing (expected scans 606). For each existing (i.e., previously arrived) series, a decision code receives the parameters (e.g., metadata, volume, and optionally others described herein) and for each predicted series, the estimated arrival time and optionally confidence level of the series' arrival are specified, along with the predicted series parameters (e.g., metadata and optionally others as described herein). Optionally, a predicted EOS (End-Of-Study) time 610 is indicated, and is replaced by the actual EOS when the study is completed.

Exemplary data flow 600 may include the following processing stages:

Series, including existing scans 604 available for processing and expected scans 606 predicted to become available for processing in the future may undergo a relevancy check 612, by being filtered for relevancy (e.g., checking whether relevant anatomy is depicted, checking for presence of IV contrast in the scan).

Score(s) for Optimality-Criteria (OC) 614 may be computed. The OC may include one or more of (616): a performance-score computed for predicted performance of the image analysis ML model analyzing a predicted series and/or actual performance of the image analysis ML model analyzing an available series, TAT-score indicating time of arrival of predicted series, and cost-score indicating predicted resource utilization for predicted series and/or actual resource for available series. Each score may be, for example, a floating number between 0 and 1, where 0 represents a poor match and 1 represents a good match (e.g., a high performance-score means a series that performs well in the image analysis ML model). It is noted that the TAT-score may be set to 1 for series that have already arrived (i.e., no need to wait for them to become available) (see 616).

A total score 618 calculation for each series (including existing and expected 620) may be performed when the score for the expected series may further include confidence-level(s) (i.e., the certainty that the series will arrive at the estimated time and have the expected parameters and/or metadata). The score calculation may be a multiplication of weighted score factors (and optionally the confidence level when applicable) 622. The weights of the different OC may be configurable and/or dynamically adapted, for example, according to the user's choice and/or according to outcome of the image analysis ML model.

A decision 622 may be made (e.g., by the decision code), for example, the series with the highest total score is chosen 624. Analysis status 414 and control messages 410 are as described with reference to FIG. 4.

Referring now back to FIG. 7, dataflow 700 for evaluating whether an existing series 702 which is available for processing and/or an expected series 704 which is not yet available for processing are relevant 706 for being fed into one or more image analysis machine learning models, is described. It is noted that a different relevancy test 706 using the same are different data 708 and/or 710 may be performed for each specific image analysis ML model.

Features described with reference to dataflow 700 may be implemented, for example, as described with reference to feature 214 of FIG. 2.

A predicted and/or available series may be eligible for analysis by a specific image analysis ML model after being determined to meet a minimum set of requirements. For example, the series should include the relevant anatomy which the image analysis ML model has been trained on (e.g., for an image analysis ML model trained to detect a pulmonary embolism, the series should include a part(s) of the lungs). The presence or absence of IV and/or oral contrast depicted in the series, and/or parameter(s) (e.g., metadata, slice thickness) of the series should match the pathology being evaluated by the image analysis ML model.

In some embodiments, the variety of tests that may be performed may be divided into 2 main parts:

Relevant tests performed on the scans itself (i.e., volume of the image dataset) 708. Such volume tests are performed on series that are available for processing.

Relevant tests perform on the parameters (e.g., characteristics and/or metadata) of the scan 710. Such parameter tests may be applied for expected scans (using predicted parameters) and/or scans that have already arrived (using actual parameters).

Predicted series which are not available for processing may be evaluated for relevancy based on predicted parameters (e.g., the characteristics and metadata). Existing scans may be tested for relevancy using tests that require the scan volume itself and/or using actual parameters.

Some not necessarily limiting examples of tests for relevancy that require the scan volume (there may be more):

Check if a specified anatomy is included in the scan. For example, Does the scan contain lungs? If so, what is the length of the lungs included in the scan?

Does the scan include the brain?

Check contrast presence/absence, type, and phase,

Does the scan include IV contrast? If so, at what phase?

Does the scan include oral contrast?

Some examples of tests that require the predicted and/or available parameters (e.g., characteristics and/or metadata) of the predicted and/or available series:

The main anatomy scanned (e.g., head/chest/ . . . ).

Presence/absence of contrast in the study.

Slice thickness, pixel spacing, etc. . . .

It is noted that relevant series may be then further evaluated for being selected as the target series. Series that do not depict the relevant anatomy part and/or do not include other relevant scan parameters (e.g., metadata, characteristics), are ignored and/or not further processed for being selected as the target series.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant series and ML models will be developed and the scope of the terms series and ML model are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of scheduling analysis of at least one series of a study of medical images of a subject, comprising:

predicting a time when at least one series of the study which is not yet available for processing, will be available for processing;

predicting at least one parameter of the at least one series which is not yet available for processing, and obtaining the at least one parameter for series which are available;

selecting a target series according to a combination of the predicted time and the at least one parameter;

in response to the target series not yet available for processing, waiting for the target series to become available for processing; and in response to the target series being available for processing, feeding the target series into an image analysis machine learning model.

2. The computer implemented method of claim 1, wherein the study includes at least one series which is not yet available for processing and at least one series which is available for processing.

3. The computer implemented method of claim 1, further comprising:

predicting resource utilization of a computer implementing inference by the image analysis machine learning model for each series of the study, wherein the combination for selecting the target series further includes the predicted resource utilization.

4. The computer implemented method of claim 1, further comprising:

predicting a performance of the image analysis machine learning model for each series of the study including not yet available series and available series;

wherein the combination for selecting the target series further includes the predicted performance.

5. The computer implemented method of claim 1, wherein the at least one parameter includes metadata.

6. The computer implemented method of claim 1, wherein the at least one parameter is selected from a group comprising: reconstruction plane, convolutional kernels, slice thickness, contrast phase, protocol name, reason for study, reason for the series, description of study, description of the series, contrast phase, anatomy depicted in the study, and reconstruction parameters.

7. The computer implemented method of claim 1, wherein the selecting and the feeding are performed for each of a plurality of image analysis machine learning models according to a specific image analysis machine learning model of the plurality of image analysis machine learning models, wherein the target series is fed into the specific image analysis machine learning model.

8. The computer implemented method of claim 1, further comprising computing at least one respective weight for the predicted time for a respective series and/or for the at least one parameter of the respective series, wherein the combination for the respective series is computed according to the at least one respective weight.

9. The computer implemented method of claim 8, wherein the at least one weight for the subsequent series is dynamically adapted according to outcome of the image analysis machine learning model analyzing at least one preceding series.

10. The computer implemented method of claim 1, further comprising computing a score for each series of the study as a function of the combination of the predicted time and the at least one parameter; and wherein selecting comprises selecting the target series according to the score.

11. The computer implemented method of claim 10, further comprising: in response to a score of a certain series being higher than a score of a current series being processed by the image analysis machine learning model, interrupt processing of the current series by the image analysis machine learning model, and instructing processing of the certain series by the image analysis machine learning model.

12. The computer implemented method of claim 10, further comprising: in response to a score of a predicted series which is not yet available for processing being higher than a score of a current series which is available for processing, not feeding the current series into the image analysis machine learning model and waiting for the predicted series to be available for processing.

13. The computer implemented method of claim 10, further comprising:

for each series, computing a respective sub-score of a plurality of sub-scores for each of the predicted time, resource utilization of a computer implementing inference by the image analysis machine learning model, and performance of the image analysis machine learning model; and computing the score as an aggregation of the plurality of sub-scores.

14. The computer implemented method of claim 10, further comprising re-computing the score of the predicted series in response to at least one of: the predicted series being available, or after a predefined amount of time has elapsed.

15. The computer implemented method of claim 1, further comprising in response to a certain series which was previously unavailable for processing becoming available for processing, analyzing the certain series to determine actual value of at least one parameter, and correcting the predicted at least one parameter to the actual value.

16. The computer implemented method of claim 1, wherein the estimated at least one parameter of the at least one series which is not yet available for processing and/or a prediction of the time when at least one series of the study which is not yet available for processing will be available for processing, is obtained as an outcome of a prediction ML model that is fed at least one parameter of the study, and at least one parameter and time when each at least one series became available for processing.

17. The computer implemented method of claim 16, wherein the prediction ML model comprises:

(i) a series encoder that receives the at least one parameter of the study as input, and generates an outcome of an encoded vector representing the series;

(ii) a time stamped encoder that receives the encoded vector as input and the time when each at least one series became available for processing, and generates an encoded study;

(iii) a decoder that receives the encoded study as input, and generates an outcome of a prediction of a time when at least one series will become available for processing and/or a prediction of parameter(s) of the at least one series which is not yet available for processing, until an end of the study.

18. The computer implemented method of claim 16, wherein the prediction ML model is training on a training dataset of a plurality of records, wherein a record includes at least one parameter of a sample study, at least one parameter of a sample series of the sample study, and a time when the sample series became available for processing.

19. The computer implemented method of claim 1, further comprising:

in response to a certain series which was not yet available for processing, being available for processing, repeating the predicting, the predicting at least one parameter, the obtaining at least one parameter, the selecting, and the feeding.

20. The computer implemented method of claim 1, wherein selecting comprises feeding the combination into a decision machine learning model, and obtaining the target series as an outcome of the decision machine learning model, wherein the machine learning model is trained on a training dataset of a plurality of records, wherein a record is for a sample study, and includes time when a certain sample series became available for processing, at least one parameter of the certain sample series, and a ground truth indication of the target sample series.

21. The computer implemented method of claim 1, further comprising:

performing a relevancy check on each series of the study, wherein the relevancy check is performed using the predicted at least one parameter for the series which is not yet available for processing, and using the obtained at least one parameter for the series which is available and/or by analyzing the series which is available; and excluding a certain series from the selecting and the feeding according to the relevancy check.

22. The computer implemented method of claim 1, further comprising predicting an end-of-study (EOS), wherein the target series is selected in view of the predicted EOS.

23. A system for scheduling analysis of at least one series of a study of medical images of a subject, comprising:

at least one processor executing a code for:

predicting a time when at least one series of the study which is not yet available for processing, will be available for processing;

predicting at least one parameter of the at least one series which is not yet available for processing, and obtaining the at least one parameter for series which are available;

selecting a target series according to a combination of the predicted time and the at least one parameter;

in response to the target series not yet available for processing, waiting for the target series to become available for processing; and in response to the target series being available for processing, feeding the target series into an image analysis machine learning model.

* * * * *